(12) United States Patent  
Reijersen Van Buuren

(10) Patent No.: US 8,578,686 B2
(45) Date of Patent: Nov. 12, 2013

(54) WRAPPER FOR WRAPPING BALES OF CROP MATERIAL

(75) Inventor: Willem Jacobus Reijersen Van Buuren, Dirksland (NL)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 13/592,377

(22) Filed: Aug. 23, 2012

(65) Prior Publication Data

US 2012/0311970 A1 Dec. 13, 2012

Related U.S. Application Data

(63) Continuation of application No. PCT/NL2010/000172, filed on Dec. 15, 2010.

(30) Foreign Application Priority Data

Feb. 23, 2010 (NL) .................................. 1037742

(51) Int. Cl.
  *B65B 11/04* (2006.01)
(52) U.S. Cl.
  USPC .................................. 53/587; 53/210; 53/211
(58) Field of Classification Search
  USPC ..................... 53/204, 210, 211, 399, 587, 588
  See application file for complete search history.

(56) References Cited

U.S. PATENT DOCUMENTS

| 4,103,794 A | 8/1978 | Shaw |
| 4,912,911 A * | 4/1990 | Down .............................. 53/465 |
| 5,129,215 A | 7/1992 | Gratton |
| 5,483,785 A * | 1/1996 | DiCarlo ........................... 53/556 |
| 5,740,662 A * | 4/1998 | Royneberg et al. ............. 53/556 |
| 8,087,216 B2 * | 1/2012 | Noonan et al. .................. 53/461 |
| 2006/0000193 A1 * | 1/2006 | Naeyaert et al. ................ 53/587 |
| 2010/0024357 A1 * | 2/2010 | Viaud .............................. 53/116 |

FOREIGN PATENT DOCUMENTS

| EP | 1033072 A2 | 9/2000 |
| EP | 2123145 A1 | 11/2009 |
| FI | 117504 B | 11/2006 |
| WO | WO 2006 018823 A2 | 2/2006 |

* cited by examiner

*Primary Examiner* — Hemant M Desai
(74) *Attorney, Agent, or Firm* — Hoyng Monegier LLP; Coraline J. Haitjema; David P. Owen

(57) ABSTRACT

A wrapper for wrapping bales of crop material includes a frame, a wrapping table, a wrapping device, and a loading device. The loading device includes a pivotable loading structure, and at least one actuator to move the loading structure between a pick-up position and a release position, wherein the loading structure comprises two loading arms between which the bale can be arranged. A pivotable grip arm is mounted on each loading arm. The pivotable grip arms are pivotable with respect to the loading arms between a closed position and an open position, and the at least one actuator is arranged to also move at least one of the grip arms between the open and the closed position.

16 Claims, 6 Drawing Sheets

WRAPPER FOR WRAPPING BALES OF CROP MATERIAL

CROSS REFERENCE TO RELATED APPLICATIONS

This application is a continuation of PCT application number PCT/NL2010/000172 filed on 15 Dec. 2010, which claims priority from Netherlands application number 1037742 filed on 23 Feb. 2010. Both applications are hereby incorporated by reference in their entireties.

BACKGROUND OF THE INVENTION

1. Field of the Invention

The present invention relates to a wrapper for wrapping bales, in particular bales of crop material wherein each loading arm has a pivotable grip arm mounted, preferably at the distal end thereof, wherein the pivotable grip arms are pivotable with respect to the loading arms between a closed position, in which the distance between the grip arms is smaller than the width of a bale to be wrapped, and an open position in which the distance between the grip arms is larger than the width of the bale, and wherein the at least one actuator is arranged to move at least one of the grip arms between the open and the closed position.

2. Description of the Related Art

Conventional wrappers are known in the art. In a known embodiment of the wrapper, the wrapper comprises a wrapping table mounted on a frame to support the bale during wrapping, and a wrapping device mounted on the frame to wrap wrapping material about the bale. A loading device may be provided to load a bale to be wrapped from a ground surface on the wrapping table.

The loading device is typically a pivotable support structure which can be moved from a pick-up position in which a bale can be picked up from the ground surface to a release position in which the bale can be placed on the wrapping table. The pivotable support structure usually comprises two loading arms between which the bale can be arranged.

Generally, two types of loading devices can be distinguished in the art.

In a first type of loading devices, friction fit is used to lift the bale from the pick-up position to the release position. To load a bale the loading arms are arranged at opposite sides of the bales, and moved towards each other. By the resulting compression force, the bale is held between the two loading arms so that the bale can be lifted from the ground surface. An example of this type of wrapper is the "ELHO Sideliner" manufactured by Elho, Pannainen Finland, also described in Finnish patent publication FI117504, which is hereby incorporated by reference in its entirety.

A drawback of this type of loading device is that the use of forces exerted on the bale to hold the bale by friction may be less reliable, in particular when bales of low compressed crop material are lifted.

In the second type loading device form fitting is used to lift the bale. In such embodiment pivotable grip arms are provided at the distal end of the loading arms, which grip arms can be placed in an open position and a closed position. In the open position, the distance between the grip arms is larger than the width of a bale to be wrapped. In this open position of the grip arms, a bale can be positioned between the two loading arms when the wrapper is driven towards this bale. When a bale is positioned between the loading arms, the grip arms can be moved to the closed position in which the distance between the grip arms is smaller than the width of a bale. As a result, the bale is enclosed by the grip arms, the loading arms and, possibly, further parts of the loading structure. The bale can be lifted by pivotable movement of the loading structure from the pick-up position to the release position, whereby the grip arms support the bale. An example of this type of wrapper is for instance the "Agronic 1020 or 1520" manufactured by Agronic, Haapavesi, Finland, which is hereby incorporated by reference in its entirety.

A drawback of this second type of loading devices is that the movement and actuation of the grip arms requires extra parts. In particular hydraulic cylinders are arranged on the loading arms to move the grip arms between the open position and the closed position. Furthermore, the actuation of the grip arms is carried out in a separate hydraulic circuit, resulting in extra actuation steps by the user of by a control circuit controlling the loading of a bale on the wrapper. In an automatic system extra sensors have to be provided to reliably control the position of the grip arms.

Another drawback of loading devices in general is that the bale has to be relatively accurately positioned with respect to the wrapper before the bale can be successfully loaded on the wrapping table. In known loading devices, the bale to be wrapped is arranged substantially tight-fit between the loading arms to centre the bale with respect to the longitudinal axis of the wrapper. As a consequence, a bale lying on the ground surface has to be accurately approached by the wrapper to precisely position the bale between the loading arms.

As a solution to this drawback, the space between the loading arms could be increased, but this would result in the risk that the bale is positioned off-centre with respect to the longitudinal axis of the wrapper which is undesirable for the wrapping process.

BRIEF SUMMARY OF THE INVENTION

The aim of the invention is to provide a wrapper for wrapping bales of crop material obviating one or more of the above drawbacks, or at least to provide an alternative wrapper.

The present invention provides a wrapper for wrapping bales, in particular bales of crop material, characterized in that on each loading arm, preferably at the distal end thereof, a pivotable grip arm is mounted, wherein the pivotable grip arms are pivotable with respect to the loading arms between a closed position, in which the distance between the grip arms is smaller than the width of a bale to be wrapped, and an open position in which the distance between the grip arms is larger than the width of the bale, and wherein the at least one actuator is arranged to move at least one of the grip arms between the open and the closed position.

According to the invention, the same actuator is used to move the pivotable loading structure between the pick-up position and the release position, and to move at least one of the grip arms between the open position and the closed position. The use of one actuator for both the rotational movement of the complete loading structure and the movement of one of the grip arm obviates one actuator and the associated hydraulic circuit.

Furthermore, the actuator can be arranged in such manner that by one single stroke of the actuator, the actuator first moves the grip arms from the open to the closed position to enclose the bale within the loading structure, and subsequently moves the loading structure from the pick-up position to the release position. Thus, these two actions are performed directly after each other without any control action of the user or a control device being required. These two movements may also be performed partly simultaneously.

It is remarked that the wrapping table and the wrapping device may be mounted directly or indirectly on the frame.

In an embodiment, the loading structure comprises two actuators, each actuator being arranged to move one of the grip arms, and both actuators being arranged to move the loading structure between the loading position and release position. In such embodiment, simultaneous actuation of the two actuators will first result in movement of both grip arms from the open position to the closed position, and subsequently, in a movement of the loading structure from the pick-up position to the release position.

In this embodiment, the actuators are preferably connected to a control circuit configured to actuate both actuators simultaneously by one control action. In such embodiment the user only has to perform one control action to realize the required movement of the grip arms and the loading structure to load a bale on the wrapping table.

In an embodiment, the loading arms are pivotable between a receiving position and a loading position, wherein an angle between the two arms is larger in the receiving position than in the loading position.

In the loading position, the loading arms are preferably parallel to each other so that a tight-fit can be obtained between the bale and the loading arms over a relative large part of the length of the loading arms. Such tight-fit is advantageous for correctly positioning the bale with respect to the longitudinal centre axis of the wrapping table. However, this tight-fit arrangement of the loading arms makes the positioning of bale between the loading arms more difficult.

By making the loading arms pivotable between a receiving position and a loading position, wherein an angle between the two arms is larger in the receiving position than in the loading position, the loading arms can be arranged at a wider angle to make the positioning of a bale between the loading arms more easy. Once the bale is located between the loading arms, the loading arms may be moved to the loading position, wherein the angle between the loading arms is smaller. In this loading position a tight-fit enclosure of the bale between the loading arms can be assured, therewith realizing a correct position with respect to the centre axis of the wrapping table. It will be clear that the movement of the loading arms from the receiving position to the loading position may also result in correct centring of the bale.

In an embodiment, the loading structure comprises two actuators, each actuator being arranged to move one of the loading arms and one of the grip arms, and both actuators being arranged to move the loading structure between the pick-up position and release position.

In such embodiment, simultaneous actuation of the two actuators will result in movement of the loading arms from the receiving position to the loading position, movement of both grip arms from the open position to the closed position, and, subsequently, movement of loading structure from the pick-up position to the release position. Preferably, the movement of the loading arms is carried out before the movement of the grip arms. However, the movements of the loading arms and the grip arms can also be performed partly or completely simultaneously.

In an embodiment, the loading structure comprises a loading frame which is pivotably about a first axis mounted on the frame, wherein one end of each of the loading arms is pivotably about a second axis mounted on the loading frame, and wherein each grip arm is pivotably about a third axis mounted on the other end of each of the loading arms. Preferably, the first axis is substantially horizontal, and the second and third axes run substantially tangentially with respect to the first axis.

In an embodiment, each actuator is a linear actuator, preferably a hydraulic cylinder. Hydraulic cylinders are very suitable to be used as an actuator for the realization of the invention. Furthermore, in the wrapper, or the pulling vehicle for pulling the wrapper usually a hydraulic power source is available; thus, no separate power source has to be provided for the actuators.

In an embodiment, the loading arms are provided with smooth surfaces facing each other to guide a bale to a correct position with respect to the loading structure before the loading process is started. It may be possible that during the approach of a bale, the bale is not in a correct rotational or translational position with respect to the wrapper. The smooth surfaces provided on the loading arms may improve correction of the position of the bale during approach. In particular, incorrect rotational positions may be efficiently corrected by the presence of the smooth surfaces.

In an embodiment, the smooth surfaces are provided on guiding plates formed by or mounted on the loading arms. Guiding plates provide a practical realization of the smooth surfaces for correcting the rotational or translational position of a bale with respect to the wrapper.

The invention also relates to a method of loading a bale on a wrapper, wherein the wrapper comprises: a frame, a wrapping table mounted on the frame to support the bale during wrapping, a wrapping device mounted on the frame to wrap wrapping material about the bale, and a loading device to load a bale to be wrapped on the wrapping table, wherein the loading device comprises a pivotable loading structure, and at least one actuator to move the loading structure between a pick-up position, in which a bale can be picked up from a ground surface, and a release position, in which the bale can be released on the wrapping table, wherein the loading structure comprises two loading arms between which the bale can be arranged, wherein on each loading arm a pivotable grip arm is mounted, wherein the pivotable grip arms are pivotable with respect to the loading arms between a closed position, in which the distance between the grip arms is smaller than the width of a bale to be wrapped, and an open position in which the distance between the grip arms is larger than the width of the bale, and wherein the at least one actuator is arranged to also move at least one of the grip arms between the open and the closed position.

The method of loading the baler on the wrapper comprises the steps of:

positioning a bale between the loading arms of the loading structure, and loading the bale on the wrapping table by actuating the actuator or actuators, wherein upon actuation of the actuator the actuator first moves the grip arms from the open position to the closed position to enclose the bale in the loading structure, and than moves the loading structure from the pick-up position to the release position to release the bale on the wrapping table.

In an embodiment, the loading arms are pivotable between a first position and a second position, wherein an angle between the two arms is larger in the first position than in the second position, wherein upon actuation of the actuator the actuator moves the loading arms from the receiving position to the loading position, before or at least partly simultaneous to the movement of the grip arms from the open position to the closed position.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
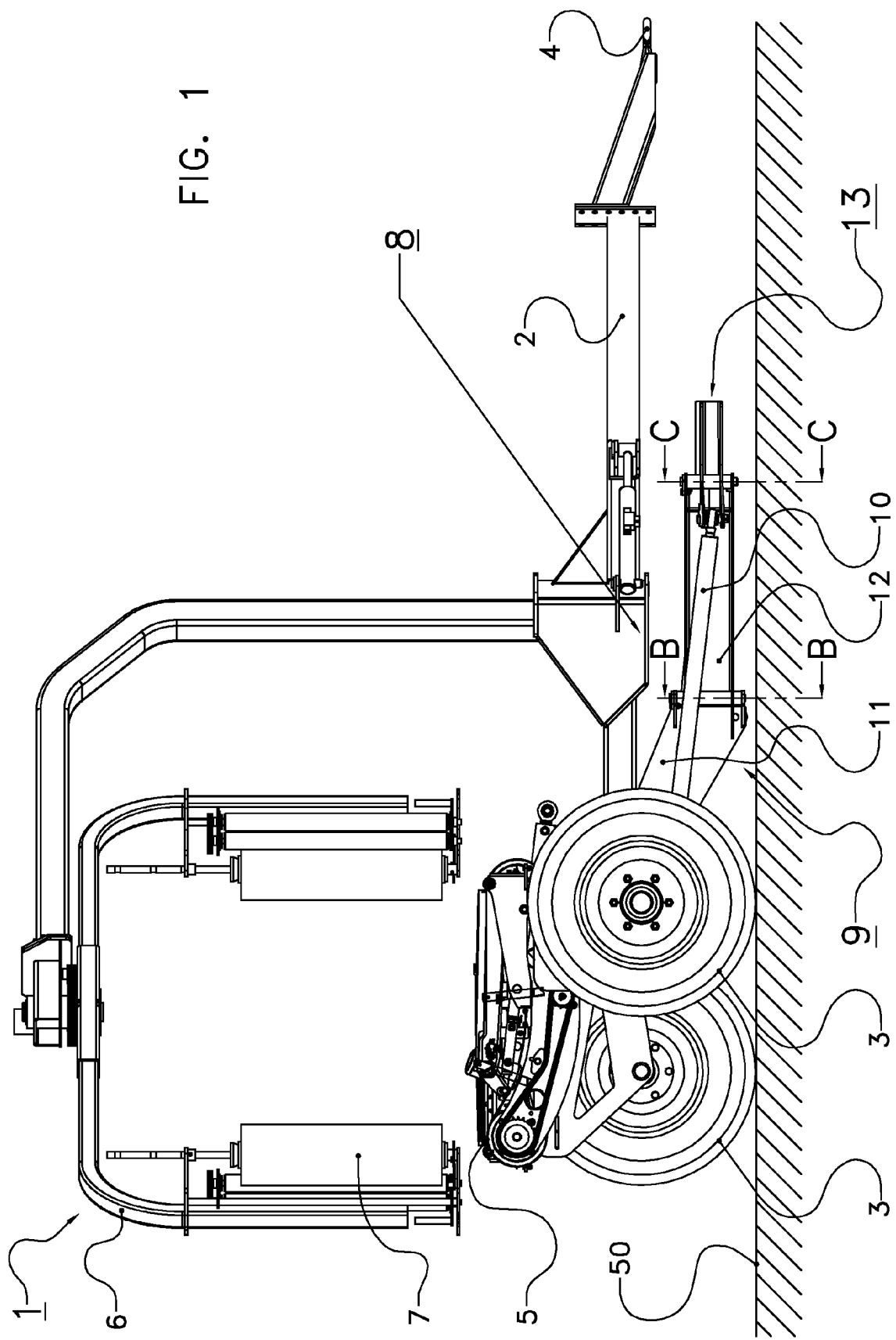
FIG. 1 shows a side view of a wrapper according to the invention.

The following is a description of certain embodiments of the invention, given by way of example only and with reference to the drawings. FIG. 1 shows a wrapper according to the invention, generally indicated by the reference numeral 1. The wrapper 1 is configured to wrap bales in wrapping material, such as plastic film material.

The wrapper 1 comprises a frame 2 which is supported on a ground surface 50 by wheels 3. The front end of the wrapper 1 comprises a coupling mechanism 4, can be connected to a pulling vehicle (not shown) to pull the wrapper over the ground surface 50. The wrapper 1 may further be connected to a hydraulic power source of the pulling device.

A wrapping table 5 and a wrapping device 6 are mounted on the frame 2. The wrapping table 5 is configured to support a bale during wrapping. The wrapping table 5 may be provided with a rotation device, for instance actuated support rolls to rotate the bale during wrapping thereof. The wrapping device 6 is provided to rotate rolls of wrapping material 7 about the bale to wrap the bale in the wrapping material.

Wrapping tables 5 and wrapping devices 6 are well-known in the art, and any suitable combination may be applied in the wrapper according to the invention. For example, lateral guide elements may be implemented in the wrapping device 6 as described in PCT/NL2010/000173, which is hereby incorporated by reference in its entirety.

A loading device 8 is provided to load a bale from the ground surface 50 on the wrapping table 5 to enable wrapping of the bale.

The loading device 8 comprises a pivotable loading structure 9 and two actuators 10 in the form of hydraulic cylinders. The pivotable loading structure 9 is movable between a pick-up position, in which a bale can be picked up from the ground surface (shown in FIG. 1), and a release position, in which the bale can be released on the wrapping table 5.

The loading structure 9 comprises a loading frame 11, two loading arms 12, and two grip arms 13. The loading frame 11 is mounted pivotably about a first substantially horizontal axis A-A (see FIGS. 2 and 3) on the frame 2. One end of each of the loading arms 12 is mounted pivotably about a second axis B-B on the loading frame 11.

Each grip arm 13 is mounted pivotably about a third axis C-C on the opposite end of the associated loading arm 12. The second axis B-B and the third axis B-B run substantially vertically, when the loading structure 9 is in the pick-up position.

The grip arms 13 are pivotable with respect to the loading arms 12 between an open position (shown in FIG. 2) in which the distance between the grip arms 13 is larger than the width of the bale, and a closed position (shown in FIG. 3), in which the distance between the grip arms 13 is smaller than the width of a bale to be wrapped.

In the closed position of the grip arms 13, a bale positioned between the two loading arms 12 is enclosed between the loading frame 11, the loading arms 12, and the grip arms 13. This enclosure of parts of the loading structure 9 realizes a form lock of the bale, and the bale can be lifted by support of the grip arms 13 and the loading frame 11.

Figure 2:
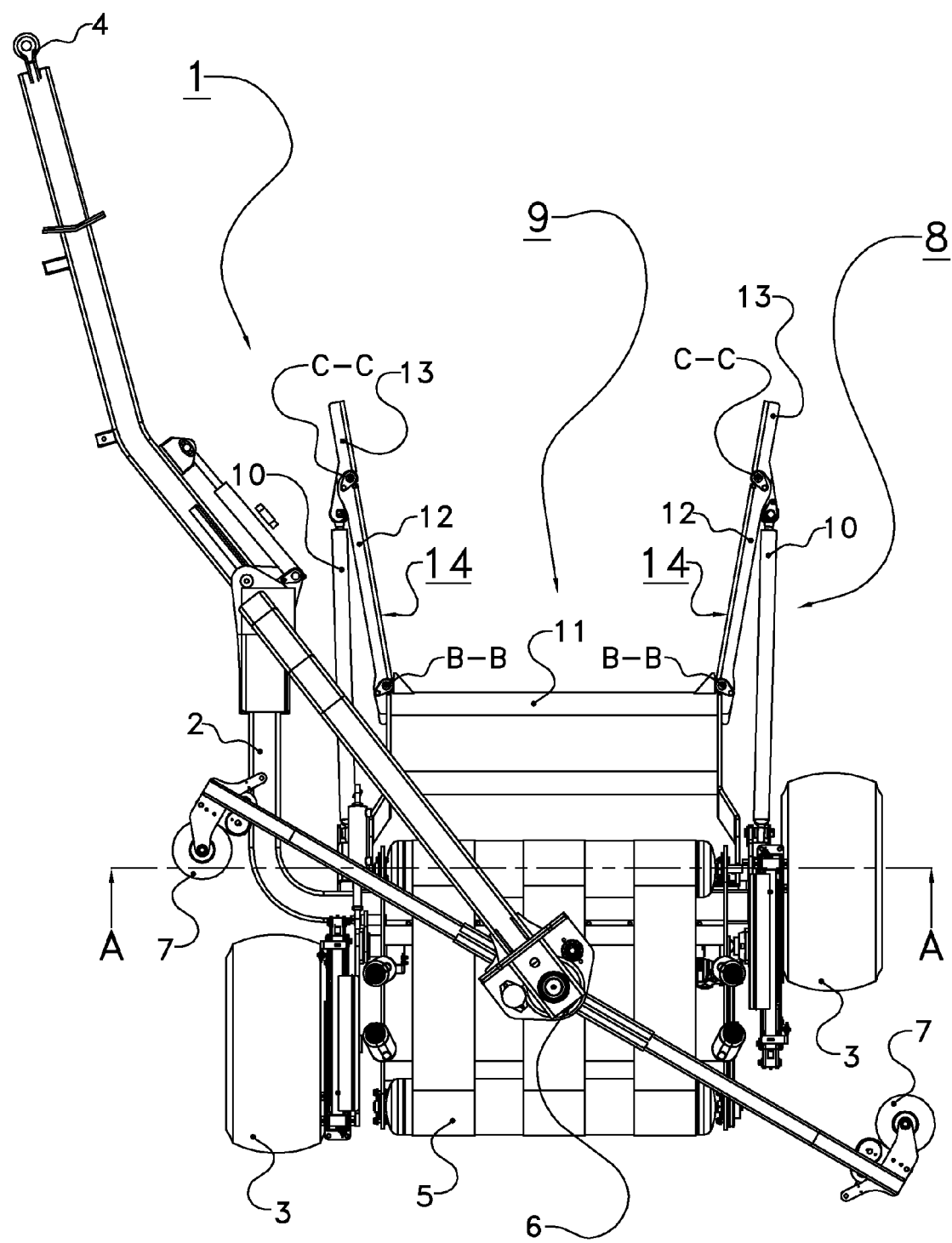
FIG. 2 shows a top view of the wrapper of FIG. 1 with the loading arms in the receiving position.
Figure 3:
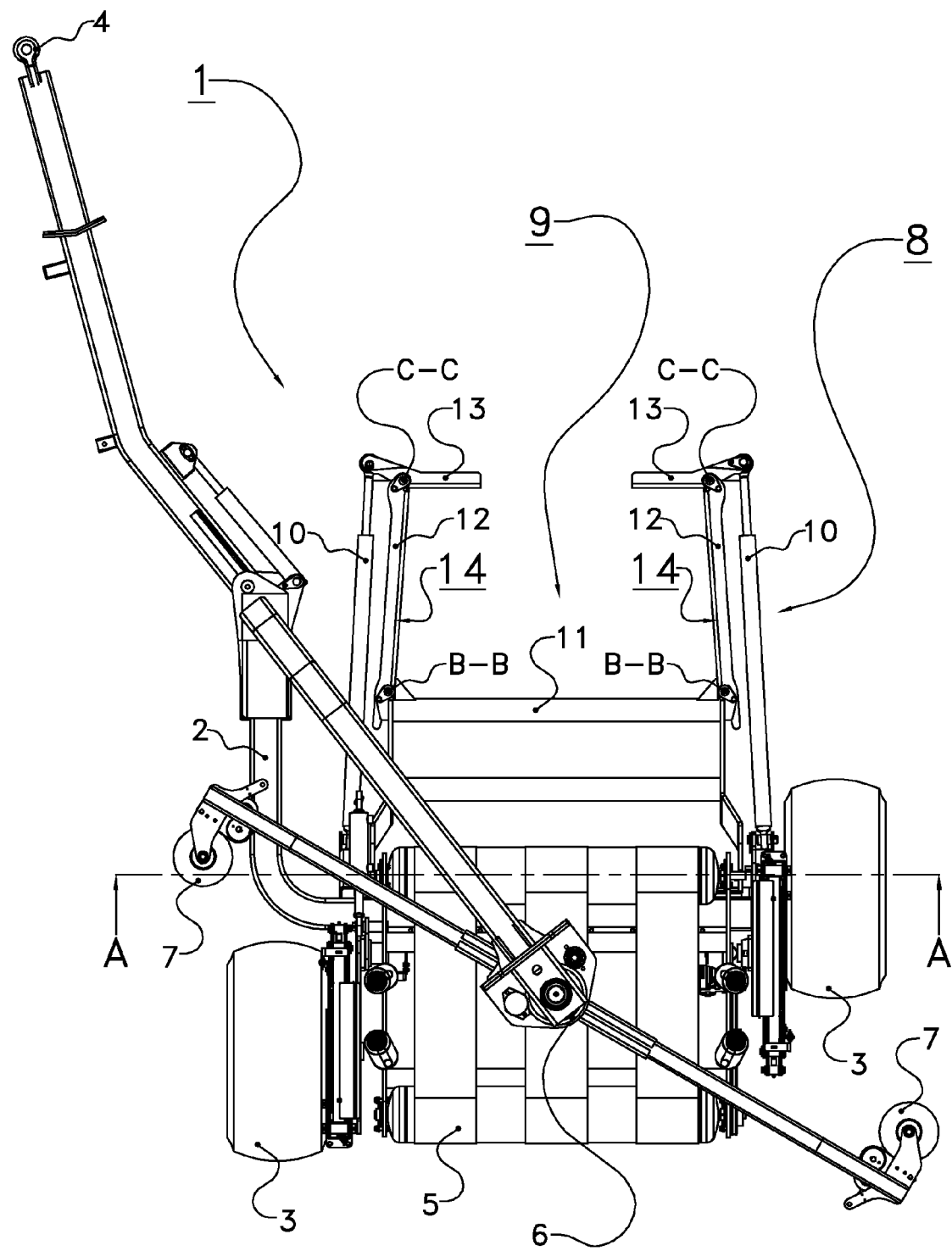
FIG. 3 shows a top view of the wrapper of FIG. 1 with the loading arms in the loading position.

The loading arms 12 are pivotable between a receiving position (shown in FIG. 2) and a loading position (shown in FIG. 3). In the loading position, the loading arms 12 are substantially parallel. The distance between the loading arms 12 substantially corresponds with the width of a bale to be wrapped, so that a bale positioned between the loading arms 12 is arranged substantially tight-fit between these loading arms 12.

In the receiving position, the distal ends of the loading arms 12 are pivoted away from each other so that the angle between the loading arms 12 is increased. In this position the distance between the distal ends of the loading arms 12 is larger than the width of a bale, and a bale can more easily positioned between the loading arms 12.

Between each grip arm 13 and the frame 2 one of the actuators 10 is provided. Each actuator 10 is arranged to move, upon actuation, the loading arm 12 between the receiving position and the loading position, to actuate the grip arm 13 mounted on the loading arm 12 between the open position and the closed position, and to move the loading structure 9 between the pick-up position and the release position.

It is remarked that each actuator 10 is arranged for actuation of the respective loading arm 12 and grip arm 13, and that the actuator 10 together move the loading structure from the pick-up position to the release position.

Generally, it is desirable that movements of the two loading arms 12 are performed simultaneously, and, similarly it is desirable that movements of the two grip arms 13 are performed simultaneously.

In view thereof, the actuators 10 are connected to a common hydraulic circuit having one actuation valve to be controlled by the user of the wrapper. Thus, only one control action of the user is required to load the bale on the wrapping table 5. This control action actuates the actuators 10, resulting in the following actions; the loading arms 12 are moved from the receiving position to the loading position, the grip arms 13 are moved from the open position to the closed position to form lock the bale in the loading structure 9, and the loading structure 9 is moved from the pick-up position to the release position to release the bale on the wrapping table 5.

The different actions are preferably performed subsequent to each other in the described order, but the actions may also partly overlap. Movement of the loading arms 12 and grip arms 13 may even completely overlap.

FIG. 2 shows the wrapper 1 of the invention ready to be pulled towards a bale to be wrapped in order to place a bale between the loading arms 12. The loading structure 9 is arranged in the pick-up position, the loading arms are positioned in the receiving position and the grip arms 13 are arranged in the open position.

When the wrapper 1 is pulled towards a bale which rests on the ground surface 50, there is a relative large space between the loading arms 12 to receive the bale between the loading arms 12. As a result less accurate approach of the bale is required to locate the bale between the loading arms 12.

Guide plates 14 are mounted on the inner sides of the loading arms 12, i.e. the sides of the loading arms 12 facing each other. These guide plates 14 are provided with relative smooth surfaces. These guide plates 14 are used to correct any translation or rotational position errors of the bale with respect to the loading arms 12. When the loading arms 12 are moved around the bale, and the bale is not in the optimal position, the smooth surfaces of the guide plates 14 may be used to translate or rotate the bale to a better position with respect to the wrapper 1.

FIG. 3 shows the wrapper 1 during the loading process. The loading arms 12 are moved to the loading position and the grip arms 13 are moved to the closed position, but the loading structure 9 is still in the pick-up position. When a bale would be arranged in the loading device 8, the bale would be enclosed by the loading structure 9.

The loading arms 12 are arranged substantially parallel to each other. The distance between the loading arms 12 is chosen that a bale would be arranged tight-fit between the loading arms 12. This has the advantage that the centre of the bale is aligned with the middle of the wrapping table. This is advantageous in view of the gravity forces exerted on the wrapping table. When the bale is located substantially in the middle of the wrapping table no or less torque is exerted on the wrapping table construction due to misalignment of the bale.

It is remarked that when, after location of the bale between the two loading arms 12, the bale is positioned off-centre with respect to the longitudinal centre axis of the wrapping table 5, this position may be corrected by the movement of the loading arms 12 from the receiving position to the loading position. Due to this movement the bale is pushed to a position, wherein the bale is enclosed in a tight-fit manner between the two loading arms 12.

Figure 4:
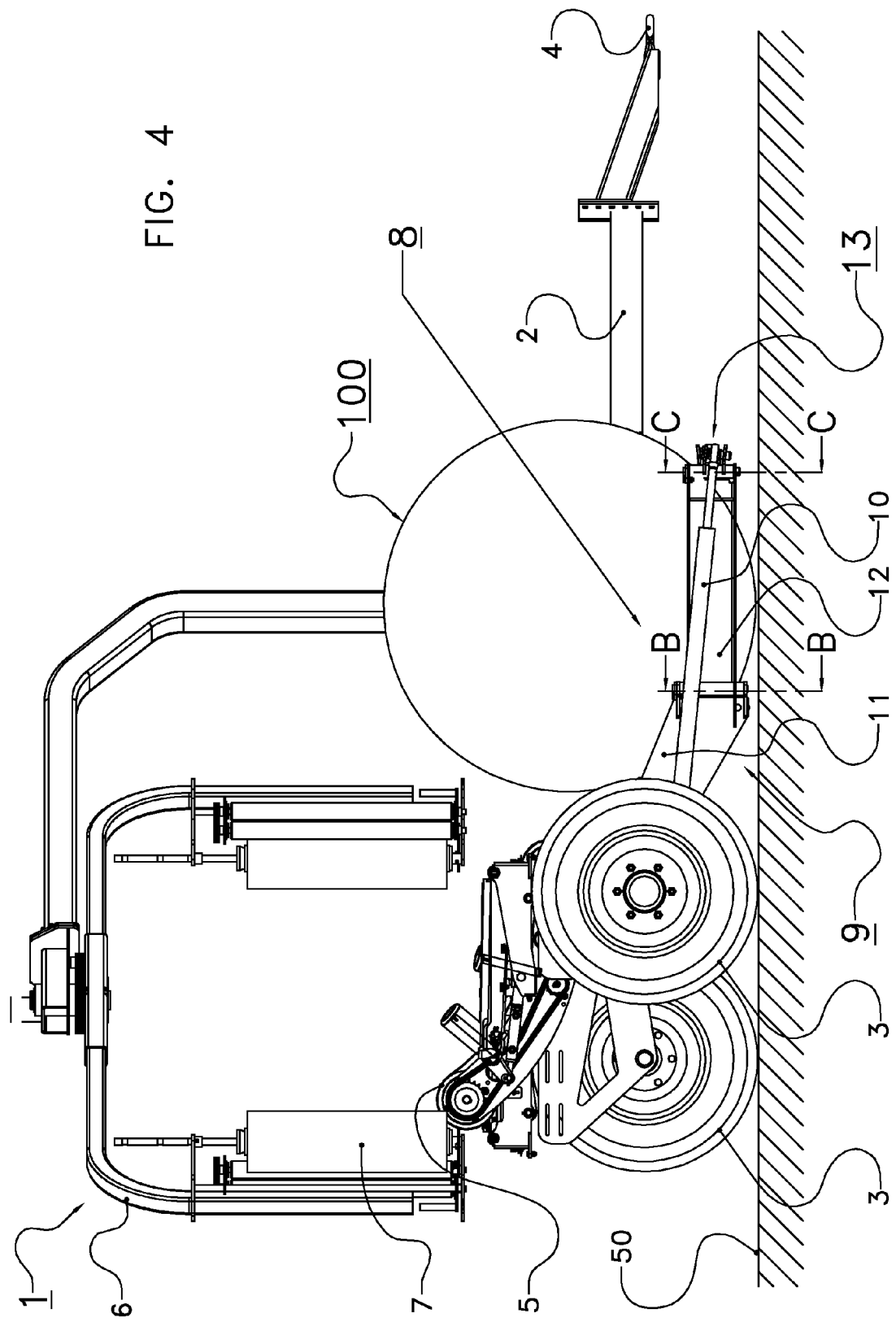
FIGS. 4 and 5 show in side view different positions of the loading device during loading of a bale.
Figure 5:
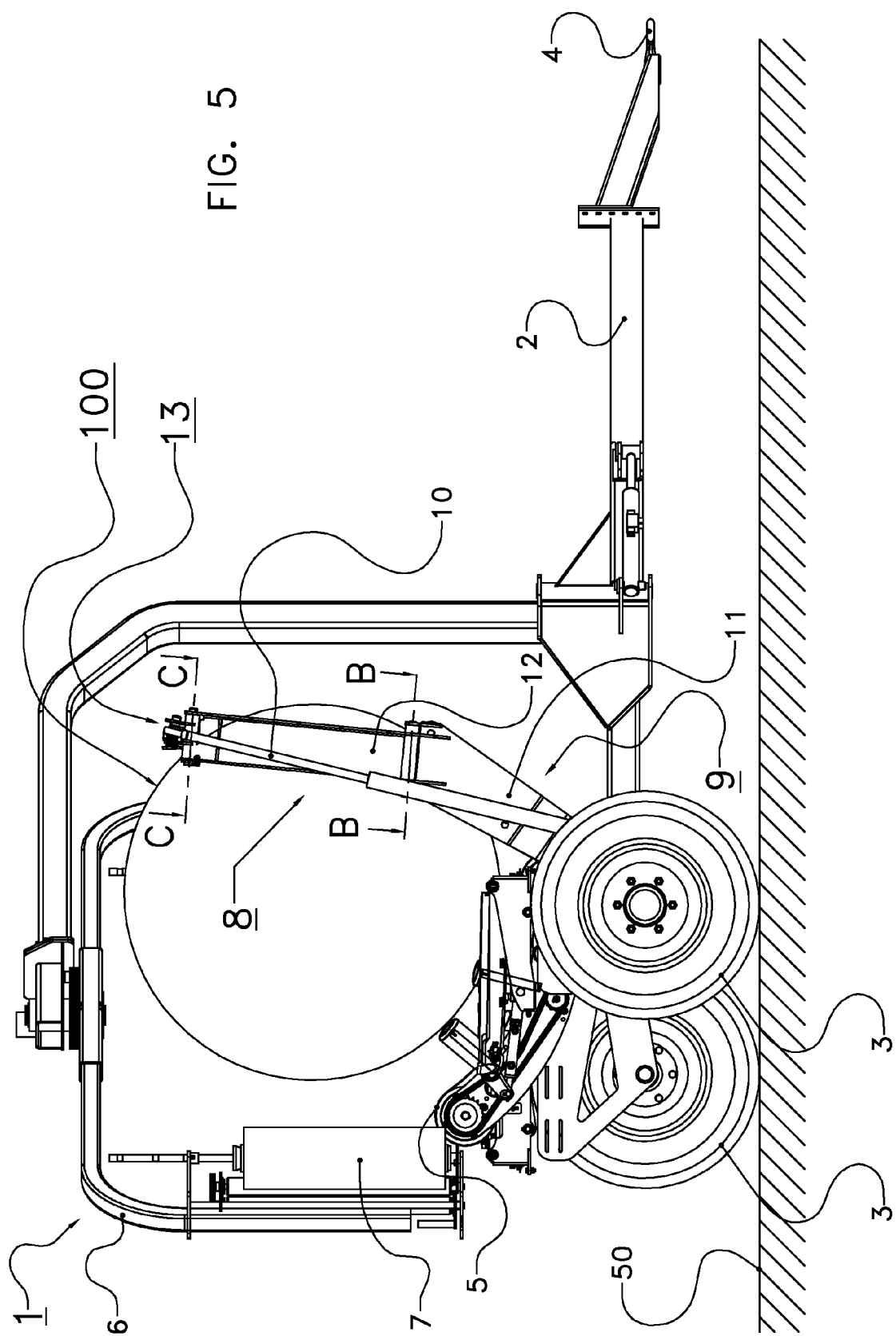

FIGS. 4 and 5 show the actual loading of a bale 100 on the wrapping table 5. The wrapping table 5 is arranged in a tilted position to facilitate receiving the bale on the wrapping table 5. When the bale is arranged on the wrapping table 5, the wrapping table may be moved back to the position shown in FIG. 1 to carry out actual wrapping of the bale 100. After wrapping has been finished the wrapping table 5 may be tilted in the opposite direction to release the wrapped bale 100 on the ground surface 50. In one embodiment, the wrapped bale may be released through the assistance of an unloading device, as described in PCT/NL2010/000174, which is hereby incorporated by reference in its entirety.

FIG. 4 shows the wrapper 1 in the same state as FIG. 3, but in side view. A bale 100 is arranged on the loading structure 9. The bale 100 is enclosed between the loading frame 11, the loading arms 12 in loading position, and the grip arms 13 in the closed position. It will be clear that bales with different diameter sizes can be loaded by the same loading device 8.

The movement of the loading arms 12 from the receiving position to the loading position, and the movement of the grip arms 13 from the open position to the closed position are performed by a single actuation action of the user activating simultaneously both actuators 10. In FIG. 4, the movement of the loading structure 8 from the pick-up position to the release position has just started. This movement is also carried out by the actuators 10, and is the result of the same single actuation action of the user.

FIG. 5 shows the loading structure 9 in the release position. In the release position the bale is released from the loading structure 9 on the wrapping table 5. This transfer may be completely caused by gravity. However, in another embodiment transfer means may be provided to actively transfer or to guide transfer of the bale from the loading structure 9 to the wrapping table 5.

After the bale 100 is arranged on the wrapping table 5, the loading structure 9 may be pivoted back to the pick-up position to make rotation of the wrapping means around the bale possible. After wrapping is finished and the wrapped bale is released from the wrapping table 5 a new bale may be loaded by the loading device 8 on the wrapping table 5 for wrapping of this new bale.

A further aspect of the wrapper 1 as described with reference to FIGS. 1 to 5 will now be discussed with reference to FIG. 6, which further aspect can be used in combination with the aspects of the invention as described heretofore, but which further aspect can also be used independently from what has been described with reference to FIGS. 1 to 5.

Figure 6:
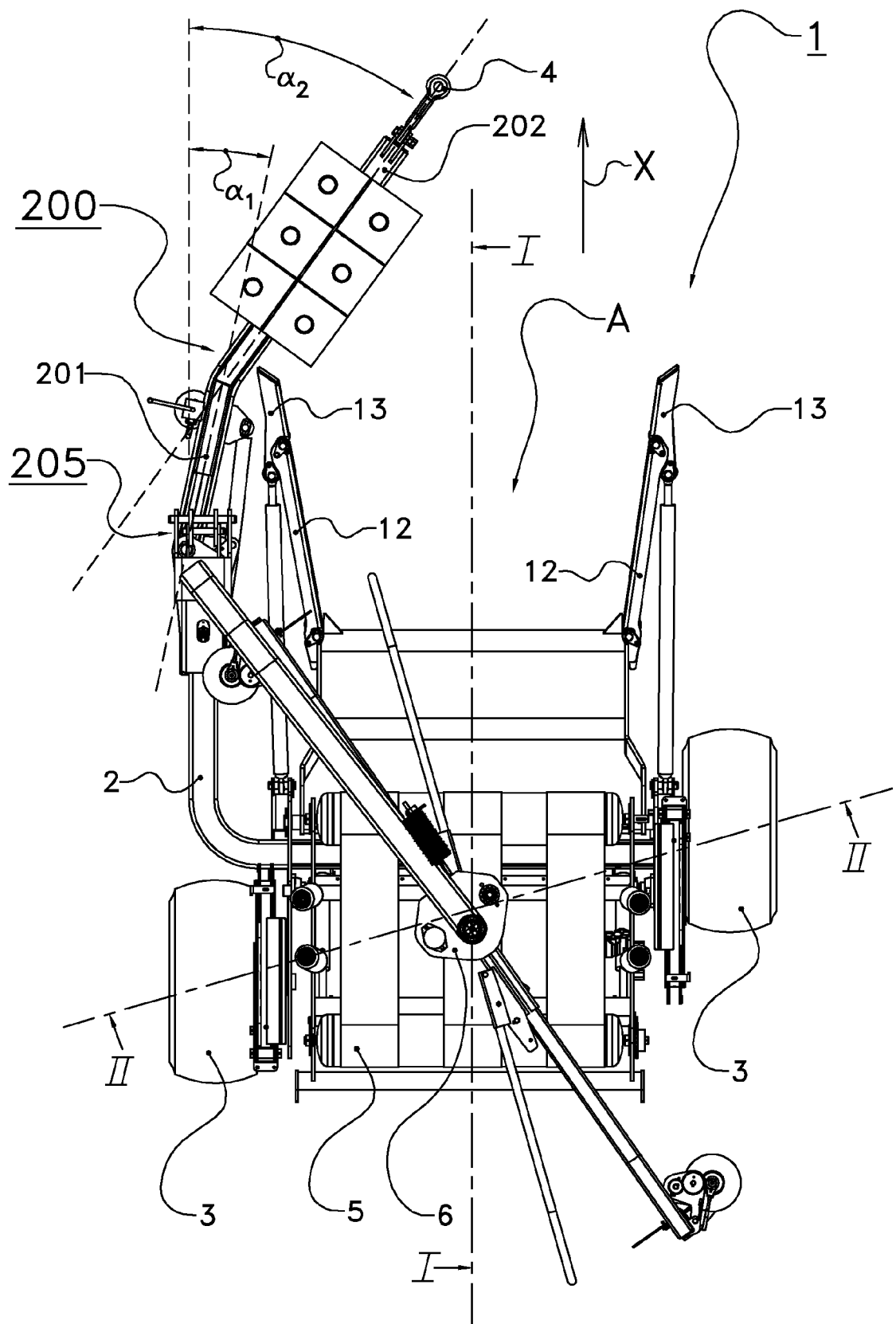
FIG. 6 shows in plane view the wrapper of FIG. 1 in a transport position thereof.

FIG. 6 shows the wrapper 1 of FIG. 1 in a position in which the wrapper 1 can be transported by a towing vehicle (not shown). The wrapper 1 as shown in FIG. 6 is exactly the same as the wrapper 1 shown in FIG. 1. Further to what has been described with reference to FIGS. 1 to 5, the wrapper 1 further comprises a towbar 200 having a first section 201 and a second section 202. The first section 201 and the second section 202 may be formed as a single piece of material, but alternatively may also be formed as two separate pieces that are attached to each other, for example by welding or any other suitable way. In the example of FIG. 6 the first section 201 extends substantially in parallel with the longitudinal axis I-I which coincides with the direction of transport (indicated with arrow X in the drawing) of the wrapper 1 when it is towed by a towing vehicle. In particular, the first section 201 extends beyond the free end of the loading arms 12. Preferably the first section 201 is angled with respect to the direction of transport X or with respect to the longitudinal axis I-I (or transport direction X) and has an angle $\alpha 1$ that lies between 0 and 20 degrees, preferably between 5 and 15 degrees.

The second section 202 extends from the first section 201 at a greater angle $\alpha 2$ with respect to the longitudinal axis I-I (or transport direction X) in the depicted transport position of the wrapper 1. The angle $\alpha 2$ with respect to the longitudinal axis I-I lies between 30 to 60 degrees, preferably between 40 to 50 degrees in the depicted transport position. As can be seen in FIG. 6, the first second section 201, 202 of the towbar 200 extend toward the longitudinal axis I-I such that when the wrapper 1 is coupled to a towing vehicle (not shown) the longitudinal axis I-I of the wrapper 1 substantially coincides with a longitudinal axis of the towing vehicle. This has the effect, that the wrapper 1 can be transported in an in-line manner with respect to the towing vehicle by said towing vehicle and that the total width of the combination of the towing vehicle and the wrapper 1 can be kept as small as possible.

In order for the wrapper 1 to be put in an operable position in which the wrapper 1 is coupled to the towing vehicle in a laterally off-set manner (see e.g. FIG. 1) from the position (the transport position) as shown in FIG. 6 and vice versa, the towbar 200 is hingedly mounted on the frame 2 by means of a hinge assembly 205.

The towbar 200 can be seen to be of a generally curved shape. More in particular it can be seen that the first section 201 and the second section 202 are angled with respect to each other in a plane that is substantially parallel to the ground 50. This has the further effect that an area that is generally denoted with A in FIG. 6 is kept free. The area A is encompassed by the loading arms 12 and is a loading area in which a bale to be loaded will be located. Consequently, the towbar 200 is located completely outside the area A. This has the advantage that it is now possible to have a bale (either round, square or rectangular) on the wrapping table 5, to pick up a second bale and to subsequently place the wrapper 1 in the transport position of FIG. 6 without being hindered in that movement by the towbar 200. Furthermore, it now becomes possible to transport two bales with the wrapper 1 according to the invention to a different location than where the bales were picked up and it also becomes possible to wrap the bale on the wrapping table 5, unload that bale and to load the bale between the loading arms 12 onto the wrapping table 5 while the wrapper 1 is in the transport position of FIG. 6. With the bended towbar 200 it even becomes possible to pick up bales that are close to obstructions.

Preferably the wrapper 1 further comprises a set of wheels 3 each arranged at a side of the wrapper 1, which wheels are positioned on a mutual axis II-II that is positioned at non-right angles with respect to the direction of transport X, or the longitudinal axis I-I. This allows for the first section 201 of the towbar 200 in the operable position thereof to extend substantially at right angles to the axis II-II of the set of wheels 3. This is beneficial from a viewpoint of stability during use (operation) of the wrapper 1.

A wrapper with the bended towbar as shown in FIG. 6 has the further advantage that the total length of the combination of the wrapper and the towing vehicle is kept limited, whereas that total length would increase considerably when a conventional straight towbar would be used to achieve the same effect of keeping the loading area between the loading arms clear from obstructions.

The wrapper as described has the advantage over prior art wrappers that it can transport two bales at the same time from the point of pick-up of the bales to a different location. Furthermore, the wrapper can also advantageously and contrary to prior art wrappers move a bale from the pick-up position to the wrapping table while the wrapper is in the transport position in which it is not laterally off-set to the towing vehicle but rather in-line therewith, i.e. substantially directly behind the towing vehicle. The wrapper achieves this while maintaining its original length.

The towbar as shown in the drawing comprises two substantially straight sections. However, the towbar may also be shaped as a bar having a continuous bend for example, which bend generally follows the shape of the towbar as shown in the drawing while still providing the same effect. Two sections however may however be preferred in view of towing of the wrapper during pick-up of bales.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A wrapper for wrapping bales, comprising:
a frame,
a wrapping table mounted on the frame to support the bale during wrapping,
a wrapping device mounted on the frame to wrap wrapping material about the bale, and
a loading device to load a bale to be wrapped on the wrapping table, wherein the loading device comprises a pivotable loading structure, and at least one actuator to move the loading structure between a pick-up position, in which a bale can be picked up from a ground surface, and a release position, in which the bale can be released on the wrapping table, wherein the loading structure comprises two loading arms between which the bale can be arranged,
wherein on each loading arm a pivotable grip arm is mounted, wherein the pivotable grip arms are pivotable with respect to the loading arms between a closed position, in which the distance between the grip arms is smaller than the width of a bale to be wrapped, and an open position in which the distance between the grip arms is larger than the width of the bale, and wherein the at least one actuator is arranged to also move at least one of the grip arms between the open and the closed position.

2. The wrapper of claim 1, wherein the loading structure comprises two actuators, each actuator being arranged to move one of the grip arms, and both actuators being arranged to move the loading structure between the loading position and release position.

3. The wrapper of claim 2, wherein the actuators are connected to a control circuit configured to actuate both actuators simultaneously by one control action.

4. The wrapper of claim 1, wherein the loading arms are pivotable between a receiving position and a loading position, wherein an angle between the two loading arms is larger in the receiving position than in the loading position.

5. The wrapper of claim 4, wherein the loading arms when arranged in the loading position are substantially parallel to each other.

6. The wrapper of claim 5, wherein the distance between the loading arms when arranged in the loading position substantially corresponds with the width of a bale to be wrapped.

7. The wrapper of claim 4, wherein the loading structure comprises two actuators, each actuator being arranged to move one of the loading arms and one of the grip arms, and both actuators being arranged to move the loading structure between the pick-up position and release position.

8. The wrapper claim 1, wherein each actuator is arranged between one of the grip arms and the frame.

9. The wrapper of claim 1, wherein the loading structure comprises a loading frame which is pivotably about a first axis mounted on the frame, wherein one end of each of the loading arms is pivotably about a second axis mounted on the loading frame, and wherein each grip arm is pivotably about a third axis mounted on the other end of each of the loading arms.

10. The wrapper of claim 9, wherein the first axis is substantially horizontal, and wherein the second and third axes run substantially tangentially with respect to the first axis.

11. The wrapper of claim 1, wherein each actuator is a linear actuator.

12. The wrapper of claim 11, wherein the linear actuator is a hydraulic cylinder.

13. The wrapper of claim 1, wherein the loading arms are provided with smooth surfaces facing each other to guide a bale to a correct position with respect to the loading structure before actuation of the at least one actuator.

14. The wrapper of claim 13, wherein the smooth surfaces are provided on guiding plates formed by or mounted on the loading arms.

15. A method of loading a bale on a wrapper as claimed in claim 1, comprising the steps of:
positioning a bale between the loading arms of the loading structure, and
loading the bale on the wrapping table by actuating the actuator or actuators, wherein upon actuation of the actuator, the actuator first moves the grip arms from the open position to the closed position to enclose the bale in the loading structure, and thereafter moves the loading structure from the pick-up position to the release position to release the bale on the wrapping table.

16. The method of claim 15, wherein the loading arms are pivotable between a first position and a second position, wherein an angle between the two arms is larger in the first position than in the second position, wherein upon actuation of the actuator, the actuator moves the loading arms from the receiving position to the loading position, before or at least partly simultaneous to the movement of the grip arms from the open position to the closed position.

\* \* \* \* \*